(No Model.) 5 Sheets—Sheet 1.

C. T. HIGGINBOTHAM.
STEM WINDING AND SETTING WATCH.

No. 458,366. Patented Aug. 25, 1891.

Witnesses
J. N. Shumway
Lillian D. Kelsey

Charles T. Higginbotham
Inventor
By attys.
Earle Seymour

(No Model.) 5 Sheets—Sheet 2.

C. T. HIGGINBOTHAM.
STEM WINDING AND SETTING WATCH.

No. 458,366. Patented Aug. 25, 1891.

Witnesses
J. H. Shumway
Lillian D. Kelsey

Charles T. Higginbotham
Inventor
By atty's
Earle & Seymour

(No Model.)  5 Sheets—Sheet 3.

C. T. HIGGINBOTHAM.
STEM WINDING AND SETTING WATCH.

No. 458,366.  Patented Aug. 25, 1891.

(No Model.) 5 Sheets—Sheet 4.

C. T. HIGGINBOTHAM.
STEM WINDING AND SETTING WATCH.

No. 458,366. Patented Aug. 25, 1891.

(No Model.) 5 Sheets—Sheet 5.

C. T. HIGGINBOTHAM.
STEM WINDING AND SETTING WATCH.

No. 458,366. Patented Aug. 25, 1891.

Witnesses
J. H. Shumway
Lillian D. Kelsey

Charles T. Higginbotham
Inventor
By attys.
Earle Seymour

UNITED STATES PATENT OFFICE.

CHARLES T. HIGGINBOTHAM, OF THOMASTON, CONNECTICUT.

STEM WINDING AND SETTING WATCH.

SPECIFICATION forming part of Letters Patent No. 458,366, dated August 25, 1891.

Application filed April 10, 1891. Serial No. 388,395. (No model.)

*To all whom it may concern:*

Be it known that I, CHARLES T. HIGGINBOTHAM, of Thomaston, in the county of Litchfield and State of Connecticut, have invented new Improvements in Stem-Winding and Stem-Setting Watches; and I do hereby declare the following, when taken in connection with accompanying drawings and the letters of reference marked thereon, to be a full, clear, and exact description of the same, and which said drawings constitute part of this specification, and represent, in—

Fig. 10 is a broken view, partly in elevation and partly in section, of a watch-movement, showing another form of my improvement and represented in its inverted position with its gravity part in the position which it takes when the watch is inverted and before its stem has been pushed in. Fig. 11 is a similar view showing the rotation of the operating-cam and the adjustment of the watch for setting consequent upon pushing in the stem when the parts are in the positions shown by the preceding figure. Fig. 12 is a similar view showing the watch turned to its upright position and with its stem pulled out to permit the gravity part to change its position with respect to the operating-cam. Fig. 12$^a$ is a similar view showing the adjustment of the parts consequent upon pushing in the stem when they are adjusted, as shown in the preceding figure. Fig. 16 is a sectional view on the line $x\ x$ of Fig. 12$^a$. Fig. 18 is a sectional view through the operating-lever and gravity part on the line $x\ x$ of Fig. 11.

My invention relates to an improvement in stem-winding and stem-setting watches, the object being to provide for setting the hands without opening the case and to avoid the displacement of the hands by the accidental shifting of either the winding or setting mechanism.

With these ends in view my invention consists in an intermediate part located between the stem and the setting mechanism of a watch and constructed and arranged to respond to the action of gravity when the watch is placed in a predetermined position, and thus effect a change in the operative conditions within the watch with respect to the stem.

My invention further consists in certain details of construction and combinations of parts, as will be hereinafter described, and pointed out in the claims.

In carrying out my invention the intermediate part constructed and arranged to respond to the action of gravity, as described, may take a variety of different forms and act in quite different ways. It may, for instance, consist of an intermediate wheel made heavy enough to respond to the action of gravity when the watch is placed in certain positions or the weight may be placed upon the staff of the intermediate wheel, or the weight having a cam-face may be pivoted within the watch and arranged to act upon the staff of the intermediate wheel, or the weight may have the form of a latch constructed to co-operate with a cam which operates on the staff of the intermediate wheel, or it may have the form of a coupler co-operating with a cam acting upon the staff of the intermediate wheel, or the weight may have still other forms and operate in still other ways, and yet embrace my invention, which consists, broadly, in a weight forming an intermediate part between the stem and the setting-train of a watch and constructed and arranged to respond to the action of gravity when the watch is placed in a predetermined position, so as to change the operative conditions within the watch with respect to the said stem.

I have shown in the accompanying drawings several different ways of carrying out my invention, the same being some of the different specific forms above mentioned.

Figs. 1 to 9, inclusive, illustrate that form of my invention in which the weight consists of a coupler, which under certain conditions connects an operating-lever with a cam acting upon the arbor or staff of the intermediate setting-wheel, the watch being shown in several different positions to clearly illustrate the positions of the parts under different circumstances.

The winding and setting trains of the watch are of ordinary construction and are therefore not fully shown, but only sufficiently to illustrate the application of my invention. In this case the weight consists of a coupler A, composed of a bar having one of its ends provided with two beveled faces $A'$ $A'$, which converge to a point and offset, as at $A^2$, upon its inner face, the inner wall of the said offset being concaved, as at $A^3$, for engagement with a coupling-pin B, mounted in the free end of an operating-lever $B'$, hung at its opposite end upon a stud $B^2$. The other end of the coupler is pivoted so as to swing freely upon a pin $A^4$, mounted in an operating-cam C, hung upon a pin $C'$, but under sufficient friction so that it will not turn of its own weight. The inner end of the cam, which is of irregular shape, is provided with a rounded finger $C^2$, which engages with the adjacent end D of the staff of the intermediate setting-wheel $D'$, the said wheel being mounted (see Figs. 6 and 7) in one end of a yoke E of ordinary construction in this class of watches.

An elongated slot $D^2$, formed in the lower plate F of the watch, is provided to permit the wheel $D'$ to be moved toward and away from the minute-wheel G, into which it meshes for setting the hands of the watch. The said wheel D' is constantly in mesh with the main winding-wheel H, as is also the intermediate winding-wheel I, which is mounted in the opposite end of the yoke E from the intermediate setting-wheel D', the wheel I being normally engaged, as will be hereinafter described, with the ratchet-wheel I' of the winding-train.

Figure 1:
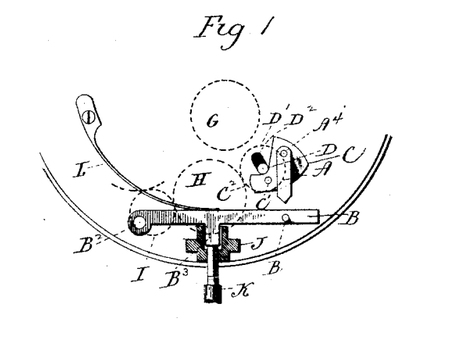
Figure 1, a broken view, partly in elevation and partly in section, of a watch-movement constructed in accordance with my invention and shown in its inverted position with its intermediate gravity part or coupler in the position which it will assume when the watch is inverted and before the stem has been manipulated.
Figure 4:
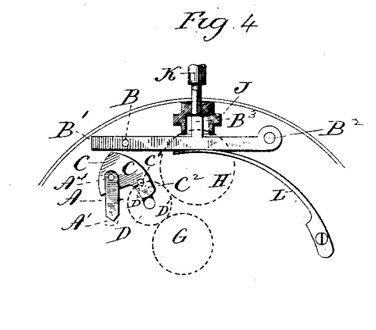
Fig. 4 is a similar view showing the watch-movement in its upright position with its gravity part disconnected from its operating-lever, its operating-cam in its active position, and its stem drawn out.

The operating-lever B', before mentioned, is provided about midway of its length, and upon its outer face, with a finger B³, which enters the hollow winding-pinion J, which is geared into the main winding-wheel H, in position to be engaged by the longitudinally-movable and rotatable stem or arbor K. A spring L, arranged to engage with the inner edge of the said operating-lever, normally holds it in its outward position, in which it is shown by Figs. 1 and 4 of the drawings. A lighter spring L' engages with that end of the yoke E carrying the intermediate winding-wheel I, and exerts a constant effort to throw the said wheel into engagement with the ratchet-wheel I'.

Figure 2:
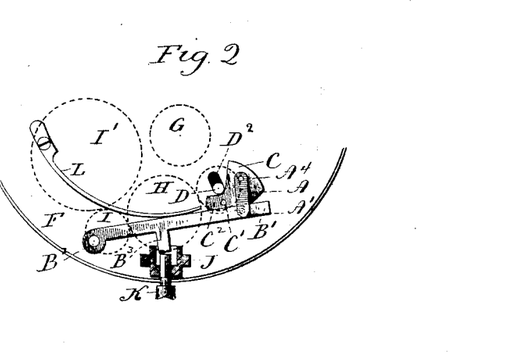
Fig. 2 is a similar view showing the coupling of the operating-lever with the operating-cam by the said gravity part consequent upon pushing in the stem when the parts are in the positions seen in Fig. 1.
Figure 3:
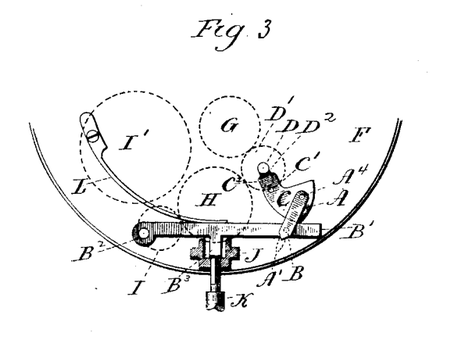
Fig. 3 is a similar view showing the rotated position of the operating-cam effected by the spring of the operating-lever upon the removal of pressure from the stem when the parts are in the positions shown by Fig. 2.

The normal condition of parts in the watch just above described will obtain when the wheel I is engaged with the ratchet-wheel I' and the wheel D' is disengaged from the minute-wheel G. In order to reverse these connections and place the watch in adjustment for setting, it must be held in an inverted position, with its stem directly downward, as shown by Figs. 1, 2, and 3 of the drawings. By placing the watch in this position the coupler A, which swings freely on its pivot A⁴, will respond to the action of gravity and assume the position in which it is shown by Fig. 1 of the drawings. The stem J of the watch is now pushed inward, carrying the operating-lever B' with it, and causing the coupling-pin B thereof to be engaged with one of the bevel-faces A' upon the adjacent end of the coupler, whereby the same is pushed one side to permit the pin to pass the offset A² of the coupler, which will then swing into position for receiving the said pin in its concaved face A³, as shown by Fig. 2 of the drawings. The cam C and the operating-lever B' having now been coupled together by the coupler A, pressure upon the stem K is removed, and the spring L, which has been placed under tension by the inward movement of the stem, will operate to restore the operating-lever to its normal position, and in so doing rotate the cam C on its pin C', whereby the staff D of the intermediate setting-wheel D' will be caused to ride up the inclined inner face of the finger C² of the said cam and forced into the inner end of the slot D², in which position it is locked by the said finger of the cam, as shown by Figs. 3 and 4 of the drawings. This movement of the arbor D and the wheel D' brings the latter into mesh with the minute-wheel G, and thus places the watch in adjustment for setting, the described movement of the wheel D' having turned the yoke E on its center against the tension of the spring L', and caused a corresponding movement of the intermediate winding-wheel I away from the ratchet-wheel I'.

In Fig. 3 of the drawings I have shown the watch turned upside down; but this is unnecessary, as the watch may be held in any position whatever just as soon as the operating-lever has been coupled with the cam by means of the coupler, which is not brought into position for operation except when the watch is turned with its stem directly downward.

Figures 5, 8:
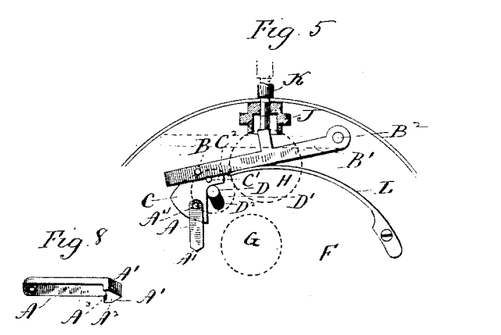
Fig. 5 is a similar view showing the effect of pushing in the stem when the parts are in the positions shown by the preceding figure, the positions of the parts in this figure being their normal positions, except for the operating-lever and the stem, the normal positions of which are indicated by broken lines.
Fig. 8 is a detached perspective view of the gravity part or coupler.
Figure 6:
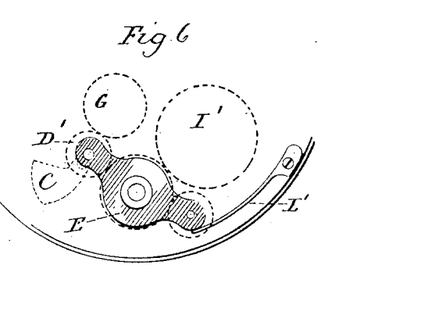
Fig. 6 is a broken view in elevation of the opposite side of the lower movement-plate with the yoke in position for setting the watch, the operating-cam being shown in its active position by broken lines.
Figure 7:
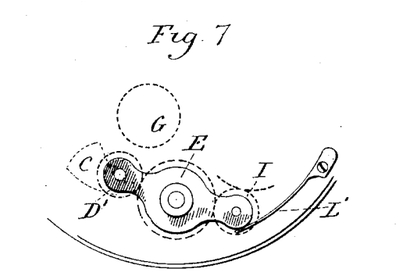
Fig. 7 is a similar view showing the yoke in position for winding the watch, the operating-cam being shown in its retired or normal position by broken lines.
Figure 9:
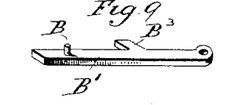
Fig. 9 is a similar view of the operating-lever.

I would call attention to the fact that preparatory to placing the watch in adjustment for setting it is absolutely necessary that it be held in an inverted position in order to cause the coupler to be swung by gravity into position to engage with the coupling-pin B, carried by the operating-lever. Just as soon, however, as that has been effected, the watch may be held in any position while it is being set. On the other hand, the watch may be adjusted for winding when held in any position. For convenience of illustration, however, I have chosen to illustrate the readjustment of the watch with the same in its ordinary position or with the stem upward, as shown by Figs. 4 and 5 of the drawings. It will be observed that, as shown by Fig. 4 of the drawings, the watch is in its setting adjustment. If now the stem be pushed inward, the operating-lever B' will engage with the curved face presented to it by the cam C, whereby the said cam will be caused to rotate on its pin C' and whereby its finger C² is disengaged from the adjacent end of the staff or arbor D of the intermediate setting-wheel D', permitting the yoke-spring L' to act in swinging the yoke into its normal position, in which the said staff D is carried into the outer end of the slot D² and the wheel D' disengaged from the minute-wheel G and the wheel I re-engaged with the wheel I', as shown by Figs. 1, 2, and 7 of the drawings. The coupler A at this time responds again to the action of gravity and drops inward, but without any operative effect.

It will be apparent from the foregoing description that a watch provided with my invention when constructed as shown by Figs. 1 to 9 of the drawings can only be put in adjustment for setting by first inverting it in position and then pushing its stem inward and withdrawing it, but that the watch can be set for winding in any of its positions. The danger of displacing the hands by the accidental shifting of the setting mechanism is therefore in this watch reduced to almost nothing, for it is impossible to conceive that the watch could be accidentally brought into an inverted position and have its stem thrust inward and then withdrawn, and in no other way can the setting-train be brought into position for operation.

Figures 10, 11, 12, 16, 18:
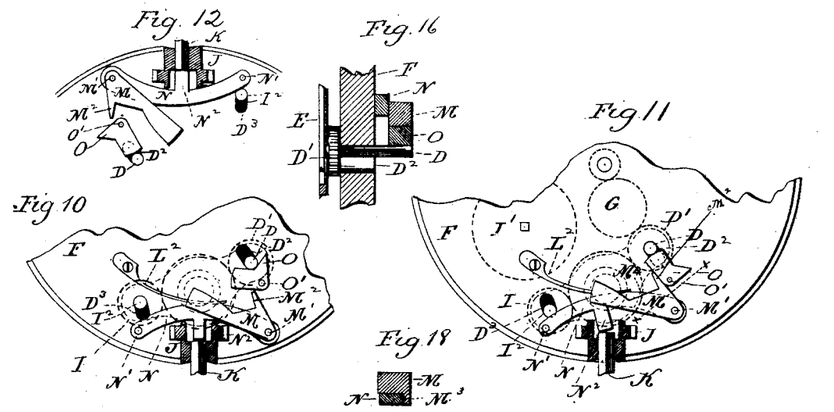
Figure 13:
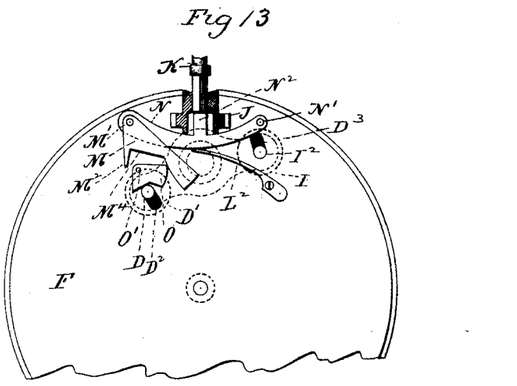
Fig. 13 is a similar view showing the positions of the parts which are secured by pulling out the stem preparatory to setting the watch but without inverting the same.
Figure 14:
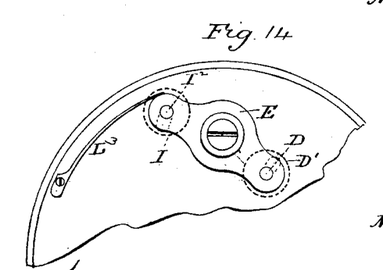
Fig. 14 is a broken view in elevation of the opposite side of the lower movement-plate, and showing the yoke in position for setting the watch.
Figure 15:
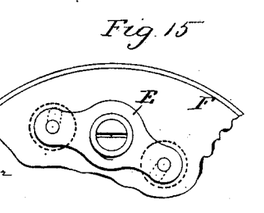
Fig. 15 is a similar view with the yoke in position for winding the watch.
Figure 17:
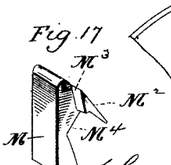
Fig. 17 is a detached perspective view of the gravity part.

Figs. 10 to 18 of the drawings show an embodiment of my invention in which the weight has the form of a latch M, hung so as to swing freely on a pin M', carried by the free end of the longitudinally-bowed operating-lever N, pivoted at its opposite end by a pin N' to the lower plate F of the movement, the said lever being provided with a stem or finger $N^2$, entering the main winding-pinion J in position to be engaged by the longitudinally movable and rotatable stem K, the said pinion and stem being of ordinary construction. The latch M is provided upon its inner edge with an offsetting portion comprising a finger $M^2$ and a banking-face $M^3$, the inner edge of the latch being also shaped, as at $M^4$, to fit the outer edge of the operating-cam O, which is hung upon a pivot O', located in the said plate F, and the inner edge of the said cam being cut away to receive the adjacent end D of the staff of the intermediate setting-wheel D', which is engaged when the watch is adjusted for winding with the minute-wheel G. The said staff D plays in a slot $D^2$, formed in the plate F, and is carried by one end of the yoke E, as shown by Figs. 14 and 15 of the drawings. The opposite end of the said yoke carries the arbor $I^2$ of the intermediate winding-wheel I, which is engaged when the watch is adjusted for winding with the ratchet-wheel I', an elongated slot $D^3$ being formed in the plate F for the arbor $I^2$ to play in. A spring $L^2$, engaging with the inner edge of the operating-lever, exerts a constant effort to throw the same to the position in which it is shown by Figs. 10, 12, and 13 of the drawings, while a spring $L^3$ (see Fig. 14) engages with the yoke and exerts a constant effort to engage the intermediate winding-wheel I with the ratchet-wheel I'.

The winding and setting trains and the yoke of this watch are of ordinary construction.

When it is desired to place a watch constructed as shown in Figs. 10 to 18 of the drawings in adjustment for setting the hands, it is inverted, as shown by Fig. 10 of the drawings, and its stem pulled outward. If preferred, this may be done before inverting the watch, as shown by Fig. 13, whereby its latch is permitted to assume under the action of gravity the position in which it is shown in the said figure, the engagement of its banking-face $M^3$ with the inner edge of the operating-lever M preventing it from falling too far. The finger $M^2$ of the latch is thus brought into range with the outer edge of the cam at a point thereon inside of the pivot O', so that when the stem is pushed inward, as shown by Fig. 11 of the drawings, the latch which moves inward with it will operate through its finger $M^2$ to turn the cam O on its axis O' and thus force the intermediate setting-wheel D' into engagement with the minute-wheel G, the yoke E being swung on its center at the same time, so as to disengage its intermediate winding-wheel I from the ratchet-wheel I'. The watch may now be set either in this position or in any other.

Figure 12A:
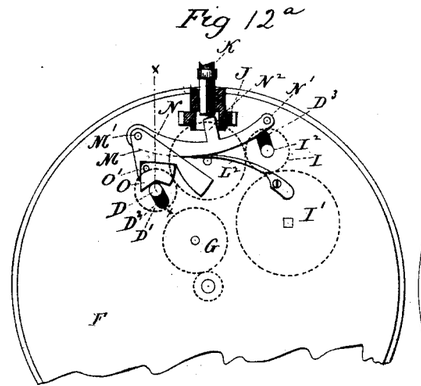

To readjust the watch for winding, it is placed in its ordinary position with its stem upward and the stem pulled out, permitting the spring $L^2$ to lift the operating-lever N and also the latch M, which is permitted to drop, so that its finger $M^2$ will be carried on the outside of the pin O' of the cam O and adjacent to the outer edge of the cam, as shown by dotted lines, Fig. 12. When now the stem is thrust in again, the said finger $M^2$ engages with the outer edge of the cam and turns the same on its pivot O', (see Fig. $12^a$,) whereby it releases the staff D of the intermediate setting-wheel D', so that the spring $L^3$ may at once operate to swing the yoke E, and thus engage the wheel I with the ratchet-wheel I'. This watch, it will be seen, can only be adjusted for setting after it has been inverted and its stem drawn out and then forced in again, and after having been adjusted for setting it can only be readjusted for winding by placing it in an upright position and first drawing out the stem and then pushing the same in again. In this watch also the chance of displacing the hands by accidentally shifting the setting mechanism is made so remote as to be practically disposed of altogether.

In the construction shown by Figs. 19 to 24 of the drawings the function of the weight P is to hold the intermediate setting-wheel D' normally out of engagement with the minute-wheel G, the weight being pivotally hung on the center H' of the main winding-wheel H and provided with an inclined and slightly-curved groove P', which is formed in its inner face in position to receive the staff D of the wheel D'.

This watch is provided with an operating-lever R, hung at one end upon a pin R' and provided at its other end with a pin $R^2$, which is engaged by one end of a spring S, which also engages under certain conditions, as will be hereinafter described, with the arbor $I^2$ of the intermediate setting-wheel I. A spring T, located on the opposite side of the movement-plate F, is arranged to hold the said wheel I in its normal position of engagement with the ratchet-wheel I'. The said operating-lever R is provided with a finger $R^3$, entering the central opening of the main winding-pinion J in position to be engaged by the stem K, which, with the said intermediate winding-wheel and the main wheel H, are of ordinary construction.

Figure 19:
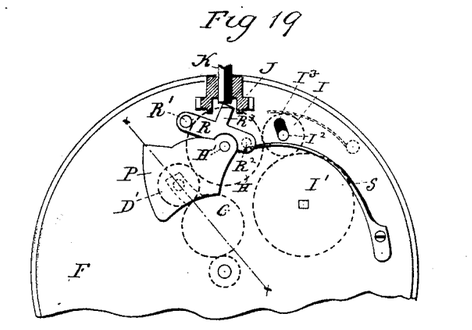
Fig. 19 is a broken view, partly in elevation and partly in section, of a watch, showing another form of my improvement, and represented with its parts in their normal adjustment, which I assume to be the adjustment of parts obtaining the greater part of the time.
Figure 20:
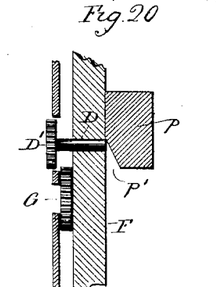
Fig. 20 is a sectional view on the line $x\ x$ of Fig. 19, and showing the intermediate setting-wheel held in its retired adjustment by the gravity part.
Figure 21:
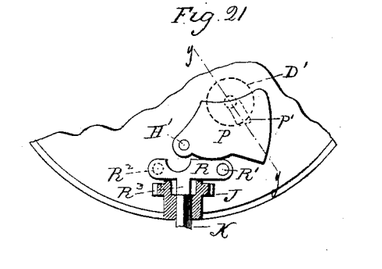
Fig. 21 is a view generally corresponding to Fig. 19, but showing the watch inverted with its stem pulled out to permit the gravity part to act in releasing the intermediate setting-wheel.
Figure 22:
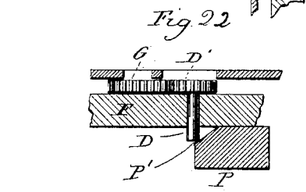
Fig. 22 is a sectional view on the line $y\ y$ of Fig. 21, and showing how the said wheel drops down into mesh with the minute-wheel consequent upon placing the watch in a horizontal position with its face upward after the parts have been brought into the adjustment shown by the preceding figure.
Figure 23:
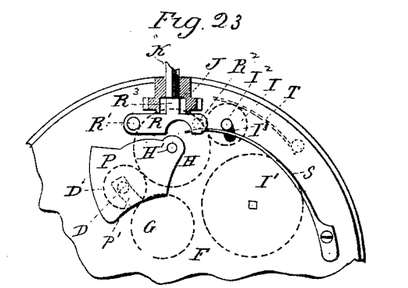
Fig. 23 is a view generally corresponding to Fig. 19, and showing the next position of the watch after Fig. 22, the watch being placed in its upright position to cause its weight or gravity part to resume its normal position and thus retire the intermediate setting-wheel, as clearly shown also by Fig. 20, and the normal adjustment of parts, as shown by Fig. 19, being secured by pushing in the stem to permit the intermediate winding-wheel to re-engage with the ratchet-wheel of the winding-train and the operating-lever to lock the gravity part in place.
Figure 24:
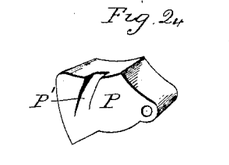
Fig. 24 is a detached perspective view of the gravity part employed in this construction.

In any of the ordinary positions which a watch constructed as shown in Figs. 19 to 24 would assume the weight P will maintain the position in which it is shown by Figs. 19, 20, and 23 of the drawings and keep the intermediate setting-wheel in its retired or cut-out position. To set the watch, it is inverted and its stem pulled out, as shown by Fig. 21 of the drawings, whereupon the weight P will respond to the action of gravity and drop away from the arbor D, so as to bring the outer and deeper part of its groove P' in alignment with the same. At the same time the pulling out of the stem permits the spring S to engage with the arbor $I^2$ of the intermediate winding-wheel I and move the said wheel outward through the length of the slot I³ in the plate F and against the tension of the spring T, which is the weaker of the two, the wheel I thus being disengaged from the ratchet-wheel I'. If now the watch is placed in a horizontal position with its face upward, the pinion D' will drop by gravity into engagement with the minute-wheel G, as shown by Fig. 22 of the drawings, after which the watch may be set.

To restore the watch into adjustment for winding, it has only to be placed with its stem or pendant upward, for then the weight P will at once respond to the action of gravity, and by engaging the inclined bottom of its groove P' with the end of the staff D force the setting-wheel D' out of engagement with the minute-wheel G and into its retired position, as shown by Fig. 20. The stem is now pushed inward again, as shown by Fig. 19, whereby the spring S is disengaged from the arbor I², leaving the spring T free to re-engage the winding-wheel I with the ratchet-wheel I'. In this construction two of the intermediate parts between the stem and the setting-train—namely, the weight P and the intermediate setting-wheel D'—are constructed to respond to the action of gravity, one when the watch is in one position and the other when the watch is in another position. The construction last considered is simple and reliable; but perhaps the chances of its accidental operation are not quite as remote as some of the constructions heretofore considered.

Figure 25:
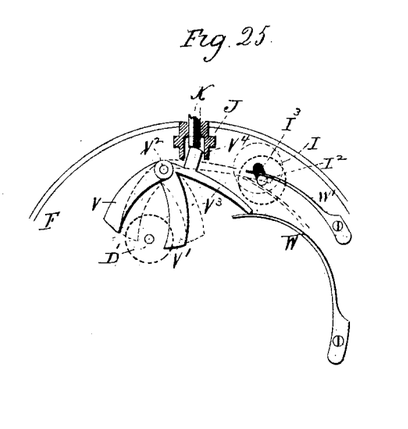
Fig. 25 is a broken view, partly in elevation and partly in section, of another form which my improvement may assume, the parts being shown in their normal or winding positions by full lines and in their setting positions by broken lines.

In the construction shown by Figs. 25 to 28, inclusive, of the drawings the intermediate setting-wheel D' is provided with a long staff D, arranged to have longitudinal movement in the two plates of the watch-movement, and provided with a cylindrical weight U, having its upper end furnished with an annular groove U' and its lower end provided with a bevel U². The said wheel D' is locked in its respective positions by means of two longitudinally-bowed locking-arms V and V' wedge-shaped in cross-section and secured at different points on the length of a staff V², which also carries an operating-lever V³, provided with a finger V⁴, which enters the main winding-pinion J in position for engagement with the stem K. The outer end of the said lever V³ is engaged by the spring W, which moves the said lever outward when the stem K is withdrawn and engages with the arbor I² of the intermediate winding-wheel I and moves the said wheel in the slot I³ and disengages it from the ratchet-wheel, which is not shown in these figures of the drawings. A lighter spring W' is provided for holding the intermediate winding-wheel in normal engagement with the ratchet-wheel when the stem K is pressed inward, as shown by Fig. 25 of the drawings. Normally the bowed arm V' engages with the bevel U², formed at the lower end of the weight U, as shown by full lines in Fig. 26 of the drawings, and holds the said weight and the wheel D' in their retired positions.

When it is desired to adjust the watch for setting, it is placed in a horizontal position with its face downward and the stem pulled outward. This will release the weight U, which will fall and carry the wheel D' with it and into engagement with the minute-wheel G, as shown by broken lines in Fig. 27 of the drawings. This will take place while the arm V is moving toward the weight and the arm V' moving away from the same and before they reach the positions in which they are shown by full lines in Fig. 28 of the drawings, the arm V in that figure co-operating with the weight to hold the wheel D' in engagement with the minute-wheel G. At the same time the spring W will lift the outer end of the arm V³ into engagement with the arbor I² of the intermediate winding-wheel I and disconnects the same from the ratchet-wheel.

Figure 26:
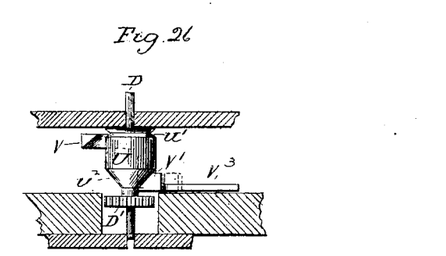
Fig. 26 is a view, partly in section and partly in elevation, showing the intermediate setting-wheel and the weight attached to its staff locked in their normally-retired positions.
Figure 27:
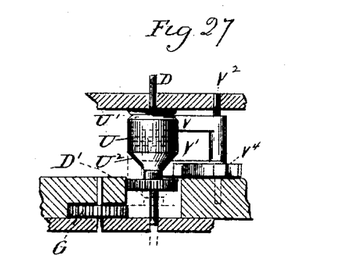
Fig. 27 is a similar but amplified view showing the minute-wheels and the staff carrying the bowed locking-arms.
Figure 28:
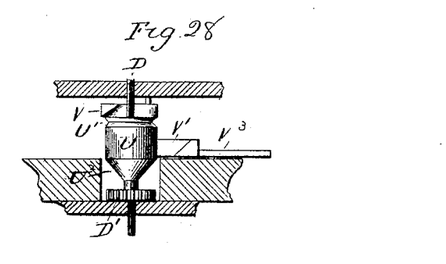
Fig. 28 is a view showing the intermediate setting-wheel and weight locked in the operative position of the former.

To readjust the watch for winding, its stem is thrust in, whereby the arm V will be cleared from the upper end of the weight and the arm V' engaged with the bevel U², formed at the lower end thereof, the weight being forced into its retired position by the beveled edge of the arm V', as shown by full lines in Fig. 26 of the drawings. The purpose of the annular groove formed in the upper end of the weight U is yet to be explained. It provides for locking the weight in its retired position in case the stem should be withdrawn while the watch is in any other position than horizontal, with its face down, for whenever the stem is pulled out without a simultaneous movement of the weight by the action of gravity the arm V is cut into the said groove.

Figure 29:
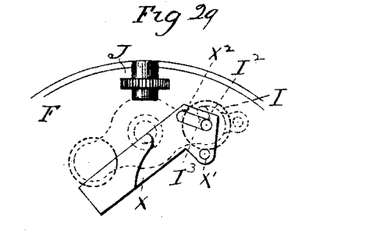
Fig. 29 is a broken view in elevation of another form of my improvement herein employing a weight to swing the yoke from the winding to the setting position of the same.
Figure 30:
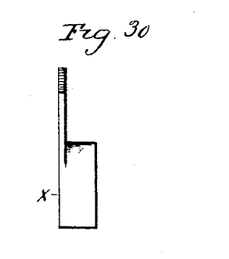
Fig. 30 is a detached view in edge elevation of the weight shown by the preceding figure.

In the construction shown by Figs. 29 and 30 of the drawings the weight X is hung near one of its ends upon a stud X' and constructed with an inclined slot X², which receives one end of the staff I² of the intermediate winding-wheel I, the said staff also passing through a short slot I³, formed in the lower movement-plate and located in a circle concentric with the center of the yoke. When a watch thus constructed is inverted, the weight in responding to the action of gravity and falling will overcome the tension of the spring employed for holding the yoke normally in position for the engagement of the intermediate winding-wheel I, carried by it, with the ratchet-wheel and temporarily swing the yoke to reverse its position and engage its intermediate setting-wheel D' with the minute-wheel G, the inclined walls of the slot X² operating upon the stud I² to swing the yoke.

Figure 31:
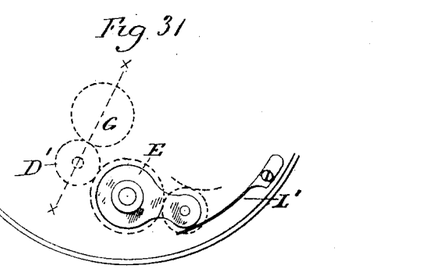
Fig. 31 is a broken view in elevation showing still another form of my improvement herein relying solely upon the weight of the intermediate steering-wheel and its staff to shift it in position.
Figure 32:
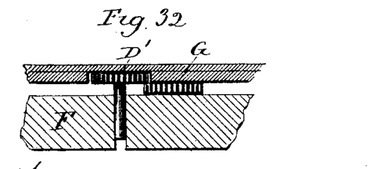
Fig. 32 is a sectional view on the line $x$ $x$ of Fig. 31, showing the watch in position for the wheel to be moved by gravity into its active position.
Figure 33:
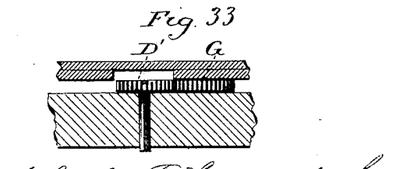
Fig. 33 is a similar view showing the wheel in that position.

In the construction shown by Figs. 31, 32, and 33 of the drawings the weight of the wheel D' is alone relied upon to move it into its operative position when the watch has been properly placed for such action. This construction does not require a longitudinally-movable stem, to which, therefore, my invention is not limited. The shifting of the wheel does, however, change the operative conditions within the watch with respect to the stem thereof. It will thus be seen that by means of a weighted part, whether the same be the intermediate setting-wheel or a weight acting directly upon the same, or a weight acting upon a cam directly engaging with the staff of the said wheel, or a weight used as a coupler, I am enabled, by taking advantage of the action of gravity, to change the operative conditions within the watch with respect to the stem thereof by simply placing the watch in one or more predetermined positions, and that by selecting the positions and properly adapting my mechanism thereto I am enabled to reduce the chance of the accidental shifting of the hands to the minimum. At the same time my device is of comparatively simple construction and reliable operation, and is applicable to stem-winding and stem-setting watches as now constructed. I would therefore have it understood that I do not limit myself to the exact construction herein shown and described, but hold myself at liberty to make such changes and alterations as fairly fall within the spirit and scope of my invention.

Having fully described my invention, what I claim as new, and desire to secure by Letters Patent, is—

1. In a stem-winding and stem-setting watch, the combination, with a rotatable stem, of winding and setting mechanism and an intermediate part located between the said stem and the setting mechanism, the said part being constructed and arranged to respond to the action of gravity when the watch is placed in a predetermined position and thus effect a change in the operative conditions within the watch with respect to the stem, substantially as described.

2. In a stem-winding and stem-setting watch, the combination, with a rotatable stem, of winding and setting trains and intermediate parts, including a wheel movable toward and away from the setting-train and a weight constructed and arranged to respond to the action of gravity when the watch is placed in a predetermined position and thus change the operative conditions within the watch with respect to the stem, substantially as described.

3. In a stem-winding and stem-setting watch, the combination, with a rotatable stem, of a winding and a setting train and intermediate parts located between the stem and setting-train, and including a wheel movable toward and away from the train, a cam to move the pinion in one direction, means for moving it in the opposite direction, and a weight constructed and arranged to respond to the action of gravity when the watch is placed in a predetermined position and to co-operate with the said cam in changing the operative conditions within the watch with respect to the stem, substantially as described.

4. In a stem-winding and stem-setting watch, the combination, with a rotatable and longitudinally-movable stem, of a winding-train and a setting-train, an intermediate setting-wheel movable toward and away from the setting-train, a cam engaging with the staff of said wheel, an operating-lever adapted to be moved in one direction by the stem, a spring for moving the said lever in the opposite direction, and a pivoted weight constructed and arranged to respond to the action of gravity when the watch is placed in a predetermined position, and virtually forming a connection between the operating-lever and the said cam, substantially as set forth.

5. In a stem-winding and stem-setting watch, the combination, with a rotatable and longitudinally-movable stem, of a winding-train and a setting-train, an intermdiate setting-wheel adapted to be moved toward and away from the setting-train, a cam to engage with the staff of the said wheel, an operating-lever adapted to be moved in one direction by the stem, a spring for moving the said lever in the opposite direction, and a coupler pivotally attached to the said cam and adapted to engage with a pin carried by the said lever when the watch is placed in a predetermined position, substantially as set forth, and whereby the said cam and lever are coupled together.

6. In a stem-winding and stem-setting watch, the combination, with a rotatable and longitudinally-movable stem, of a winding-train and a setting-train, a yoke carrying an intermediate setting-wheel at one end and an intermediate winding-wheel at the other end, a cam engaging with the staff of the said setting-wheel, an operating-lever adapted to be moved in one direction by the said stem, a spring for moving the lever in the opposite direction, a spring for normally holding the yoke, with its winding-wheel, in engagement with the winding-train, and a coupler pivotally attached to the cam and adapted to be engaged with a pin located in the operating-lever when the watch has been placed in an inverted position with its stem directly downward, substantially as described.

7. In a stem-winding and stem-setting watch, a coupler having one of its ends provided with two converging beveled faces and with an offset the inner edge of which is concaved, substantially as described.

In testimony whereof I have signed this specification in the presence of two subscribing witnesses.

CHAS. T. HIGGINBOTHAM.

Witnesses:
FRED C. EARLE,
LILLIAN D. KELSEY.